Dec. 16, 1958  S. K. EDLESON  2,864,628
QUICK DISCONNECT COUPLING
Filed July 2, 1956
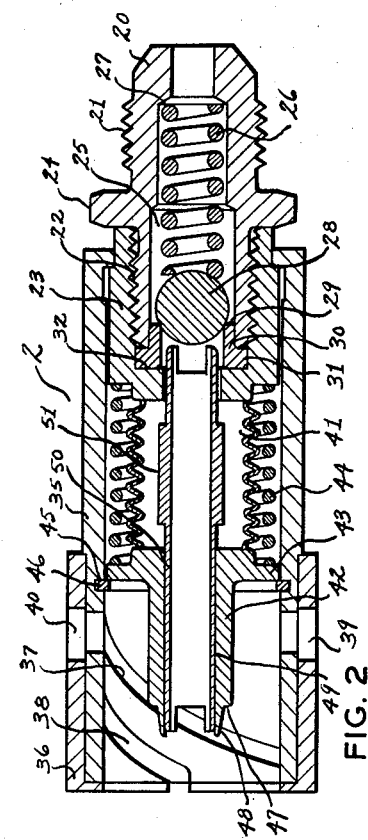
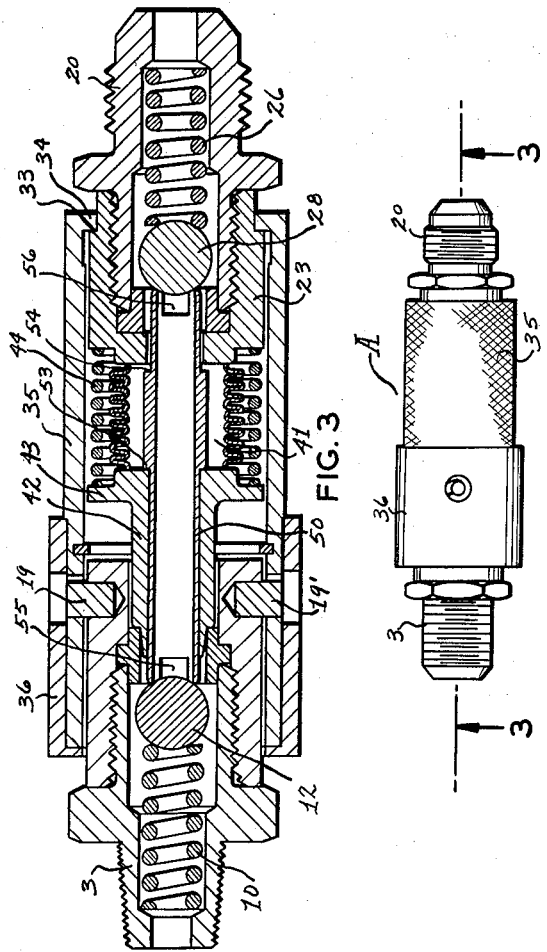
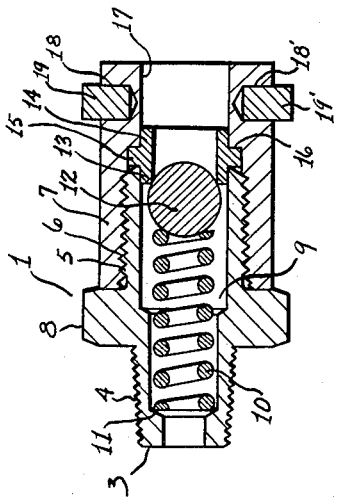
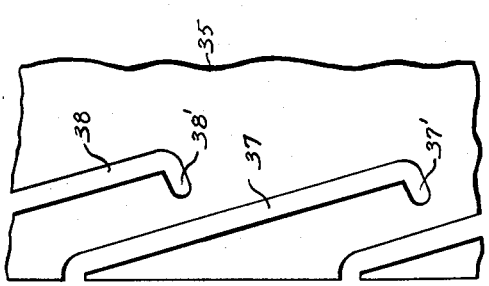
INVENTOR.
STUART K. EDLESON
BY Ralph N. Kalish
ATTORNEY United States Patent Office 2,864,628
Patented Dec. 16, 1958

2,864,628

QUICK DISCONNECT COUPLING

Stuart K. Edleson, Berkeley, Mo., assignor to Essex Mfg. Co., Inc., St. Louis, Mo., a corporation of Missouri Application July 2, 1956, Serial No. 595,374

8 Claims. (Cl. 284—18)

This invention relates in general to pipe couplings and, more particularly, to a quick disconnect coupling adapted for usage with low temperature, pressurized fluids.

Heretofore, numerous efforts have been directed toward developing sealing means for couplings of the quick disconnect type which will effectively prevent fluid leakage when flow connection is established between the cooperating coupling elements. Almost invariably such sealing means have been of the washer or ring type, disposed for compressive reception between the confronting, parallel end surfaces of the coupling members when the latter are in fully engaged relation. However, such sealing members have not proved satisfactory, since they tend toward early distortion both from limited wear and from the high pressure of the fluid flowing through the coupling. Furthermore, such sealing members are subject to relatively rapid deterioration resulting from the temperature and character of the fluids. This has been especially the case with low temperature fluids, such as liquid oxygen utilized in present day high altitude aircraft. Attempts have been made to arrange and position the sealing means so as to remove same from contact with the fluids, but such efforts have, perforce, caused costly coupling design, with attendant laboriousness of effecting replacement.

Therefore, it is an object of the present invention to provide a coupling for use with low temperature fluids having a sealing element disposed in one coupling member for cooperation with a poppet in the other coupling member to effect a reliable fluid-tight joint.

It is another object of the present invention to provide a coupling for the use stated having a sealing element which integrally comprises a valve seat.

It is a further object of the present invention to provide a coupling designed to effect a wedging engagement between cooperating elements to form a leak-proof seal; there being means for urgingly maintaining said elements in such engagement.

It is an additional object of the present invention to provide coupling sealing members constructed of such material as to resist deterioration from direct contact with low temperature, pressurized fluids.

It is a still further object of the present invention to provide contractable means in one coupling member forming a seal externally of the fluid passage.

It is another object to provide a coupling of the type stated having a valve located in each of the cooperating members, with means providing a differential in the forces resisting opening of said valves.

An additional object of the present invention is to provide a coupling adapted for quick and effective union and disconnect; which includes unique means for retaining same in valve-open condition; and which is compact, economical in manufacture, and durable and reliable in usage.

These and other detailed objects are obtained by the structures illustrated in the accompanying drawing, in which—

Figure 1 is a plan view of a quick disconnect coupling constructed in accordance with and embodying the present invention.

Figure 2 is a sectional elevation of the coupling members in uncoupled state, with the valves closed.

Figure 3 is a transverse section taken on the line 3—3 of Figure 1, showing the coupling fully united, with the valves open.

Figure 4 is a flat pattern view of the camming slots.

Referring now to the drawing which illustrates the preferred embodiment of the present invention, A generally designates a quick disconnect coupling comprising cooperating, coaxial male and female members 1, 2. Male member 1 comprises a nipple 3, externally threaded in its outer and inner end portions as at 4, 5, for respective engagement to a fluid line (not shown) in the customary manner and to the internal threads 6 of a body section 7; there being an intermediate engagement surface 8, of preferably hexagonal design, for a suitable tool, such as a wrench, spanner, or the like. Nipple 3 is counterbored to form a chamber 9 for receiving a helical compression spring 10 bearing at one end against a shoulder provided in nipple 3 and at its other end against a ball valve 12 for biasing same against a valve seat 13, constituting the outer end portion of a sealing element 14, constructed, preferably, of Teflon (trademark of E. I. du Pont de Nemours & Co. for tetrafluoroethylene resin) or like material including metal resistant to deterioration or impairment of sealing qualities through contact with fluids at relatively high pressures and low temperatures. Sealing element 14 is of cylindrical form having substantially centrally an external annular flange 15 for snug reception between the end face of nipple 3 and a ledge 16 formed on the interior of body section 7, whereby member 14 is securely maintained in position. Body section 7 is provided in its outer portion with a bore 17 of substantially like diameter as that of chamber 9 of nipple 3, so that said sealing element 14 will project into the passage thereby formed.

Press fitted into diametrally opposed openings 18, 18' in the exterior face of body section 7 are radially outwardly projecting pins 19, 19' respectively, for purposes presently appearing.

Female coupling member 2 comprises a nipple 20 of similar design as nipple 3 above described, having external threading at 21, 22, for respective engagement to a fluid line (not shown) and a body section 23, a tool engagement surface 24, and counter-bored to provide a chamber 25 for a compression spring 26 interposed between an internal shoulder 27 and a ball valve 28. Spring 26 is fabricated of heavier stock than spring 10 of coupling member 1 and hence, of relatively greater strength; said spring 26 urges ball valve 28 into engagement, or valve-closed condition, against the outer seat-forming end 29 of a sealing element 30, preferably constructed of Teflon. Sealing element 30 is of short tubular form, being externally contoured to form a flange 31 which is tightly interposed between the inner end face of nipple 20 and an internal shoulder 32 provided on body section 23. The inside diameter of the bore of body section 23 and that of sealing element 30 are substantially the same, defining a passage communicating with chamber 25. Adjacent its outer end, body section 23 contains a shoulder 33 for abutment against the inturned outer end flange 34 of a sleeve 35 within which body section 23 is received. Sleeve 35 is externally knurled at one end and at its other or inward end has surroundingly fixed thereon a cap 36. Internally at its inner end sleeve 35 is provided with a pair of camming slots 37, 38, for respective reception of pins 19, 19' of male coupling member 1 in bayonet-like engagement; said slots 37, 38 following a general spiral form with their inner extremities being reversely curved to define locking or detents portion 37', 38' respectively (see Figure 4); there being openings 39, 40 in cap 36 respectively aligned with said detents 37', 38' to permit ready observation of the disposition of pins 19, 19' therein. Secured, as by soldering to the inner face of body section 23 is a bellows 41, the other end of which is fixed to the outwardly directed, or confronting end face of a poppet 42, having a radial, base flange 43; said poppet 42 presented lengthwise of sleeve 35 and co-axial therewith; there being a coil spring 44 disposed encirclingly about bellows 41 and bearing at its ends against the adjacent end faces of body section 23 and poppet 42 for assisting the contracting and expanding action of bellows 41. Said spring 44 and bellows 41 urge poppet 42 toward the inner end of sleeve 35 (or toward the left in Figures 2 and 3); said sleeve 35 being provided with an annular groove, as at 45, receiving a retaining ring 46 for abutment against radial flange 43 of poppet 42 to determine one limit of movement thereof. As its inward end poppet 42 is provided with an external shoulder 47 and endwise therefrom is inwardly tapered, in general frusto-conical form, as at 48. Said poppet member 42 includes an axial bore 49 within which is disposed, for relative movement therein, a stem 50 having an axial passage 51; and being of such length as to normally extend from a point just within the conical end of poppet 42 to a point immediately inwardly of valve seat 29 for ball valve 28. In its portion between poppet 42 and body section 23, within bellows 41, stem 50 is diametrically increased, forming external shoulders 53, 54 for abutment against the proximate end faces of poppet 42 and body section 23, respectively. Stem 50 is transversely slotted at each of its ends as at 55, 56, for defining ports for communicating with chambers 9, 25 when members 1, 2 are fully coupled.

In order to effect union between members 1, 2 so as to develop flow connection between the fluid lines connected to nipples 3 and 20, pins 19, 19' of coupling member 1 will be received within camming slots 37, 38 of member 2, with poppet 42 projecting in bore 17 of body section 7. Axial and rotative movement will be applied to member 2 so as to move said pins 19, 19' relatively along said slots 37, 38 with the first resistance to such movement being effected by abutment of the tapered end 48 and shoulder 47 of poppet 42 against the interior and inner end surfaces of sealing element 14. Further application of pressure to continue such movement will cause the institution of compression of bellows 41 and spring 44, with consequent outwardly directed travel of poppet 42 away from retaining ring 46 (or toward the right in Figure 3), as member 1 is thereby further received within member 2, and with the slotted end 56 of stem 50 being brought into contact with ball valve 28. However, the strength of spring 26 is such as to maintain ball valve 28 against unseating upon such contact so that as member 2 continues toward the left in Figure 3 bellows 41 and spring 44 further compress causing poppet 42 to move relatively outwardly along stem 50, with the adjacent end 48 being brought into engagement with valve ball 12, and effecting unseating thereof as spring 10 is overcome by the applied pressure. Thus, it will be noted that at this stage the valve in coupling member 1 is opened while the valve in companion member 2 is still in a closed state. On further movement of coupling member 2, engagement will be effected between the outer end face of poppet 42 and shoulder 53 of stem 50, whereby the latter is forced against ball valve 28 for unseating of same, as the strength of spring 26 is effectively countered, with fluid flow being thus established through coupling A.

Camming slots 37, 38 are of such length and so designed that immediately subsequent to the opening of valve 28, pins 19, 19' will be moved into the short, reversely curved detent or locking sections 37', 38', and be thereby brought under influence of bellows 41 and spring 44, so that the latter will maintain same in locked position, and thereby assure retention of coupling member A in fully open condition.

The coupling of the present invention is especially adapted for usage with pressurized fluids under low temperatures, as to the extent of —300° F., and will effectively operate within an ambient temperature range of from —65° F. to 160° F., and being thereby particularly suited for utilization with liquid oxygen systems in high altitude aircraft. The Teflon sealing elements 14 and 30 are resistant to degeneration through contact with fluids at extremely low temperatures and under substantial pressures, so that fluid tight conditions will be reliably maintained during usage. It will be seen that as the union of members 1, 2 is effected, a wedging action is developed between the conical end 48 of poppet 42 and sealing element 14 so that the joint therebetween becomes successively tighter as members 1, 2 are interengaged. Thus, this unique coaction between poppet 42 and sealing element 14 assures a leak-proof seal. Furthermore, it must be noted that bellows 41 provide an external seal about stem 50, since it is fixed at its ends to body section 23 and poppet 42. The engagement between ball 28 and sealing element 30, under influence of spring 26, will be leak-resistant so that no inadvertent fluid loss might develop subsequent to the opening of ball valve 12 and prior to the opening of ball valve 28.

It will be seen that coupling A may be readily disconnected by reversingly rotating member 2 so as to remove pins 19, 19', from detent sections 37', 38', whereby under the release of the load upon bellows 41 and spring 44, poppet 42 will be quickly restored to abutment against ring 46, with consequent return movement of pins 19, 19' through their respective slots 37, 38, and with stem 50 being thereby moved relatively inwardly of poppet 42 and out of engagement with ball valves 12 and 28 so that the latter may be returned into seated disposition under force of the related springs 10, 26. It will thus be seen that the disconnect operation is quickly and efficiently effected so that no accidental loss of fluid will develop thereon.

It should be understood that changes and modifications in the formation, construction, arrangement, and combination of the several parts of the quick disconnect coupling may be made and substituted for these herein shown and described without departing from the nature and principle of my invention.

Having thus described my invention, what I claim and desire to secure by Letters Patent is:

1. A pipe coupling consisting of first and second cooperating members, cam means for effecting union of said members upon relative axial and rotative movement thereof, said first part comprising a valve, a sealing member having at one end a valve-seating portion, resilient means urging said valve against said valve-seat portion of said sealing member, said second cooperating member comprising a poppet for engagement with said sealing member at its other end, said poppet being adapted for axial movement upon union of said members, said poppet having an axial bore, a stem disposed within the poppet bore for relative slideable movement therein for projecting beyond one end thereof upon union for engaging said valve to effect unseating of same.

2. A pipe coupling consisting of first and second cooperating members, cam means for effecting union of said members upon relative axial and rotative movement thereof, said first part comprising a valve, a sealing member having an axial bore and a valve-seat portion at one end, resilient means urging said valve against said valve-seat portion of said sealing member, said second cooperating member having a sleeve comprising a body section disposed toward one end of said sleeve, a poppet provided in said sleeve spacedly from said body, resilient means interposed between confronting ends of said poppet and said body for urging same apart, said poppet and body section having aligned bores, said poppet being adapted for axial movement upon union of said members, a stem disposed in the bores of said poppet and body section for relative slideable movement therein for projecting beyond one end thereof upon union of said members for engaging said valve to effect unseating of same, said poppet having at its other end a tapered portion for reception within the bore of said sealing member of the first cooperating member.

3. A pipe coupling comprising first and second cooperating members, means for engaging said members together in coupled relation, a valve member provided in each of said cooperating members, said valve members being of like size, a sealing element provided in each of said members and having a valve-seat forming portion, spring means in each member for urging the related valve into seated disposition, the spring means in said second member being relatively stronger than that in said first member, and a tubular stem located in said second member for engaging said valves at its opposite ends for unseating of same when the members are coupled, whereby the unseating of the valve member of said second member will be subsequent to that of the other by reason of the relative strength of the associated spring means.

4. A pipe coupling comprising first and second cooperating members, means for engaging said members together in coupled relation, a valve member provided in each of said cooperating members, a sealing element provided in each of said members and having a valve-seat forming portion, spring means in each member for urging the related valve into seated disposition, the spring means in said second member being relatively stronger than that in said first member, a poppet in said second member for joint-forming relationship with the sealing element in said first member, a stem slideably disposed in said poppet for relative axial movement, and resilient means urging said poppet into engagement with said sealing element of the first member.

5. A separable pipe coupling comprising interfitting male and female members, fastening means for removably fastening said members in interfitting engagement, said female member having a sleeve and comprising a nipple, a body section engaged on said nipple, said nipple and body section having axially aligned bores to form a fluid passage, a normally closed axially movable valve provided in said nipple bore, a tubular poppet having an axial bore and at its inner end a radially projecting base flange provided in said sleeve for axial movement therein, resilient means bearing at one end against the inner face of said body section and at its other end against said poppet base flange for urging same away from each other, a tubular stem member slideably disposed within the bore of said poppet and said body section for continuing said fluid passage, said male member having a fluid conduit aligned with the fluid passage of said female member, an axially movable check valve disposed in said fluid conduit of the male member, means provided in said male member for engaging said poppet and effecting travel of same within the female member sleeve against the pressure of the resilient means when said members are fully fastened whereby said stem will be relatively axially moved into valve-opening engagement at each of its ends with said female member valve and male member check valve.

6. A pipe coupling as described in claim 5 wherein an expansible bellows extends between said female member body section and said poppet base flange, a compression spring disposed encirclingly about said bellows for bearing at its opposite ends against said female member body section and poppet base flange, and said stem being provided with a pair of spaced apart external detent surfaces for respectively engaging the end face of said female member body section and said poppet base flange for limiting the movement of the same toward each other upon compression of said bellows and spring.

7. A pipe coupling as described in claim 6 wherein said poppet at its outer end portion is provided with an external shoulder and tapers from said shoulder toward its outer end edge, and wherein said stem is provided with at least one end notch at each of its ends.

8. A separable pipe coupling comprising interfitting male and female members, fastening means for removably fastening said members in interfitting engagement, said male member comprising a nipple having an axial bore and being externally threaded on its inner end portion, a body section internally threaded for engagement upon the threaded inner end portion of said nipple and having a bore cooperating with the nipple bore to provide a continuous fluid passage, said body section having an internal shoulder for spaced disposition from the end face of said nipple, a tubular sealing member having a body portion and an annular flange projecting from the outer surface thereof, said flange being securely held between said body section shoulder and nipple end base, said sealing member body portion being disposed within said fluid passage, a valve provided in said nipple bore, one end of said sealing member forming a seat for said valve, said female member having a sleeve and comprising an axially movable poppet disposed in said sleeve and having an axial bore, a body section presented spacedly from the inner end of said poppet, spring means normally urging said poppet away from said body section, said poppet having an external shoulder adjacent its outer end for abutting the other end of said male member sealing member, said poppet tapering from said shoulder toward its proximate end edge for extension within said sealing member and wedging engagement with the inner walls thereof, the end portion of said poppet beyond said shoulder being of less extent than the length of said male member sealing member, and a tubular stem slideably disposed within said poppet for relative extension beyond its tapered end for unseating said male member valve when said members are fully fastened.

References Cited in the file of this patent
UNITED STATES PATENTS

| | | |
|---|---|---|
| 99,846 | Clark | Feb. 15, 1870 |
| 931,128 | Keith | Aug. 17, 1909 |
| 1,612,168 | Benckenstein | Dec. 28, 1926 |
| 1,637,325 | Jacques | July 26, 1927 |
| 1,968,075 | Ewald | July 31, 1934 |
| 2,166,874 | Monzingo | July 18, 1939 |
| 2,327,611 | Scheiwer | Aug. 24, 1943 |
| 2,453,389 | Thomas | Nov. 9, 1948 |
| 2,730,380 | Espy et al. | Jan. 10, 1956 |
| 2,740,625 | Taylor | Apr. 3, 1956 |

FOREIGN PATENTS

| | | |
|---|---|---|
| 197,436 | Great Britain | May 17, 1923 |